United States Patent [19]
Orletsky et al.

[11] Patent Number: 5,741,170
[45] Date of Patent: Apr. 21, 1998

[54] MODULAR BEEHIVE

[76] Inventors: Darryl W. Orletsky; Katherine D. Orletsky, both of P.O. Box 2975, Mesa, Ariz. 85214; Gilbert J. Hinz, 1903 S. Standage Cir., Mesa, Ariz. 85202

[21] Appl. No.: 687,241

[22] Filed: Jul. 25, 1996

[51] Int. Cl.[6] .................................................. A01K 47/00
[52] U.S. Cl. .............................. 449/7; 449/30; 449/41
[58] Field of Search ................................ 449/7, 13, 15, 449/26, 29, 30, 41

[56] References Cited

U.S. PATENT DOCUMENTS

| 1,854,871 | 4/1932 | Trauner | 449/7 |
| 4,981,458 | 1/1991 | Johnston | 449/7 |

FOREIGN PATENT DOCUMENTS

| 7456 | 5/1902 | Austria | 449/41 |
| 922743 | 1/1955 | Germany | 449/41 |
| 3319598 | 12/1984 | Germany | 449/13 |
| 1281231 | 1/1987 | U.S.S.R. | 449/26 |

Primary Examiner—Robert P. Swiatek
Attorney, Agent, or Firm—Schmeiser, Olsen & Watts

[57] ABSTRACT

According to the preferred embodiment, a hive system for housing a plurality of bee colonies. The hive system comprises a hive system body, including a framework and a plurality of perimeter walls forming a hive system interior space. At least one divider wall is used to divide the interior space into a plurality of bee chambers, with each bee chamber housing one bee colony. It is thus an advantage of the present invention to provide an improved structure for housing bees.

2 Claims, 1 Drawing Sheet

MODULAR BEEHIVE

BACKGROUND OF THE INVENTION

1. Technical Field

This invention generally relates to a beekeeping, and more specifically beehives.

2. Background Art

Honey bees have been domesticated and raised for centuries. Some bees are kept for the honey, pollen, propolis and other products they produce. Other honey bees are kept strictly for their use in pollination. The pollination of plants with honey bees is a vital part of the agricultural system. With the increased use of pesticides limiting the number of natural pollinators, the use of honey bees specifically to pollinate fields has become a growing industry.

Since the 1850's, the hives used for most bee keeping operations have remained essentially unchanged. Beehives are typically a type of box in which multiple "frames" are stored. The frames are wood or plastic boards hung in the hive onto which honeys bees draw out wax "honeycomb." The honey bees use the honeycomb to raise young, store pollen and of course, store honey. These frames are removable from the hive, allowing the beekeeper to remove honey and otherwise work with the hive.

There are several important requirements for commercially used beehives. First, the hive must provide the bees with protection from the elements, i.e., they must be weather-tight and well insulated. Second, the hive must maintain the proper spacing between individual components, i.e., the space between the frames and between the frames and sides. If spaces in the hive are too large, the bees will fill in the space with wax called "burr comb" or "brace comb." If the spaces are too small, the bees will close off the space with propolis. Thus, the elements of a hive must be properly spaced or the elements will be stuck together by the bees, making it very difficult to access the hive and remove its parts when needed.

The basic design of almost all bee hives used in commercial apiaries today dates back to the 1850's Langstroth design. Unfortunately, there are several disadvantages to the Langstroth design.

First, the Langstroth hive has been traditionally made entirely from wood. Although wood has some advantages such as low cost, use of wood exclusively causes many problems. An entirely wood hive suffers from excessive wood rotting caused by the inherent humidity in the hive and the effects of weather. Additionally, the Langstroth wood design was dimensioned using true lumber dimensions of 1852. Because wood is no longer so dimensioned, the Langstroth design results in excessive wood waste, increasing its cost.

The Langstroth hive also has the disadvantage of being formed with permanent fasteners such as nails or staples. A typically Langstroth hive could have over 190 of these fasteners. It is common for the high moisture fluctuations in the hive to force the fasteners out of the wood in the hive, weakening the hive and potentially causing injury to workers and vehicle tires. Also, the permanent nature of the fasteners makes it difficult to replace individual pieces of the hive that become rotted or damaged.

Typical Langstroth hives are also poorly insulated. Most use no insulation and are not well sealed. This can allow the hives to become too hot in the summer and too cold in the winter.

The typically Langstroth hive is also poorly designed with regard to the use of accessories such as pollen traps, entrance reducers, mouse excluders, vented closures, frog excluders or shaded entrance devices. For this reason it is sometimes difficult to use these accessories efficiently.

Perhaps the greatest limitation of the Langstroth hive design is the difficultly in moving the hives. The Langstroth hive as designed was never intended to be moved. This limitation can be a burden on all types of beekeeping operations, but it is especially problematic for pollination hives that are typically moved frequently from one area to the next to pollinate agricultural crops. Honey bees used for pollination must be able to be moved frequently, in all seasons, and often for great distances.

The Langstroth hives are relatively unstable and easily fall over and break apart while being moved. This has forced beekeepers to use a variety of devices i.e., straps, metal squares and hive staples, to hold the Langstroth hive together while loading it on a truck. Furthermore, once on the truck, all manner of straps, ropes, "V" boards and laths are used to secure the hives while the truck is actually in motion. Once the hives arrive at the fields, they are preferably distributed across the fields. Again, the inherent instability of the Langstroth design makes it difficult to use tractors and forklifts to move hives across the rough fields without them falling over and breaking apart. These problems have led to the industry practice of paying beekeepers a premium when it is necessary to spread the hives across the fields.

The Langstroth hives are also not easily sealed, making it difficult to move the hives. Unsealed hives must either be moved only at night (impossible when interstate distances are involved) or using giant nets that cover the trucks. The nets are expensive, and require extensive time to set up and remove from the trucks.

The Langstroth hives also have the disadvantage of being inefficient in their use of truck space. The dimensions of the hive do not efficiently use the space on the truck and they are difficult to stack. Because the hives do not fit well on current sized trucks, the cost of moving the hives is excessive.

Some attempts have been made to improve the basic hive design. For example, U.S. Pat. No. 4,199,832 issued to Glasscock et al, discloses a hive design made of urethane foam panels that provides improved insulation without being disliked by the bees. Likewise, U.S. Pat. No. 3,968, 531 issued to Cartwright discloses a molded plastic hive. Both of these designs overcome some of the limitations of the Langstroth hive design, such as susceptibility to wood rot and limited insulation, but they do not address many of the problems of the Langstroth design.

Thus, the hives used today suffer from several limitations and problems. In particular, Langstroth and other known hive designs are particularly unsuited for pollination bee colonies that must be frequently moved from one field to the next. Therefore, there existed a need to provide an improved hive design that overcomes the limitations and problems of the prior art.

DISCLOSURE OF INVENTION

According to the present invention, a hive system for housing a plurality of bee colonies is provided. The hive system comprises a hive system body, including a framework and a plurality of perimeter walls forming a hive system interior space. At least one divider wall is used to divide the interior space into a plurality of bee chambers, with each bee chamber housing one bee colony. It is thus an advantage of the present invention to provide an improved structure for housing bees.

BRIEF DESCRIPTION OF DRAWINGS

The preferred exemplary embodiment of the present invention will hereinafter be described in conjunction with the appended drawings, where like designations denote like elements, and.

BEST MODE FOR CARRYING OUT THE INVENTION

A beehive system of the preferred embodiment is provided that overcomes the limitations of the prior art in an efficient and cost effective manner. The beehive system stores multiple bee colonies in an easy to construct and flexible system that allows multiple bee colonies to be easily transported. The preferred embodiment system further allows for individual portions of the hive system to be easily replaced when they become damaged or rotted.

Figure 1:
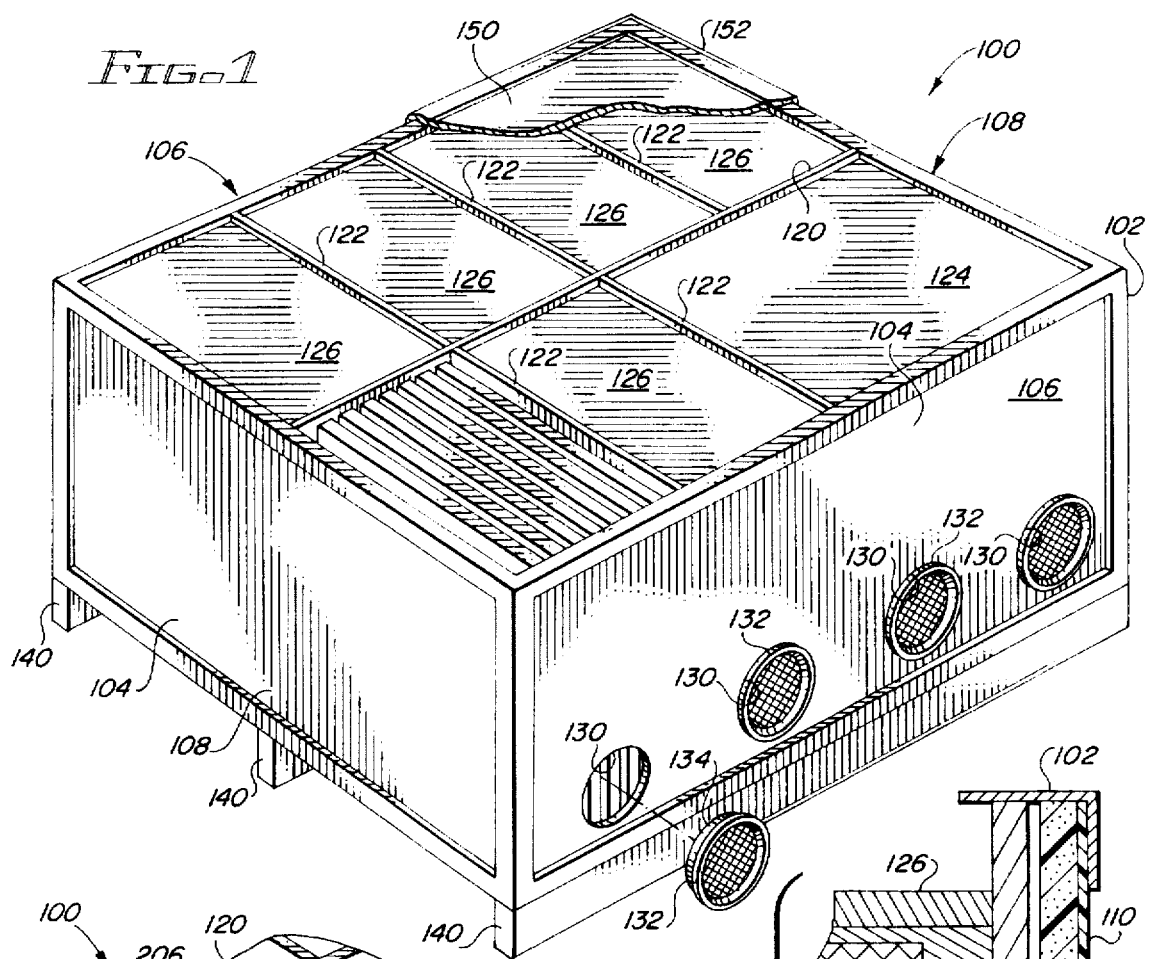
FIG. 1 is a perspective view of a hive system in accordance with the preferred embodiment.

Referring to the figures, FIG. 1 is a perspective view of a hive system 100 in accordance with the preferred embodiment of the present invention. The hive system 100 comprises a hive system body. In the preferred embodiment, the hive system body is a rectangular parallelpiped, with a rigid framework outlining the exterior corner edges of the rectangular parallelpiped. The rigid framework 102 can comprise any suitable material, such as plastic, wood, aluminum, but the preferred embodiment uses strong, inexpensive, and durable metal for the framework 102.

In the preferred embodiment with a rectangular parallelpiped hive system body, there are four exterior perimeter walls 104. The four exterior perimeter walls include two front walls 106 (one not shown in FIG. 1) and two side walls 108 (one not shown in FIG. 1).

The preferred embodiment is dimensioned to provide a hive system 100 that contains a plurality of optimally sized bee colonies, that each hold industry standard sized frames, in a manner that is inherently stable and easy to move. Furthermore, the hive system 100 is dimensioned to be manufactured from currently available materials with little or no material waste. With this in mind, the preferred embodiment has front walls with an outside length of 3'9.875", and side walls with an outside length of 3'5.875". The height of the exterior perimeter walls is preferably 1'8.125". As will be shown later, this results in a preferred embodiment bee hive system that is able to house eight colonies of honey bees, each with a hive chamber that holds fourteen industry standard Langstroth-type frames with appropriate bee spacing. A hive system 100 with these dimensions also has the advantage of efficiently using space on standard size commercial trucks that typically have an eight foot wide bed.

Figure 3:
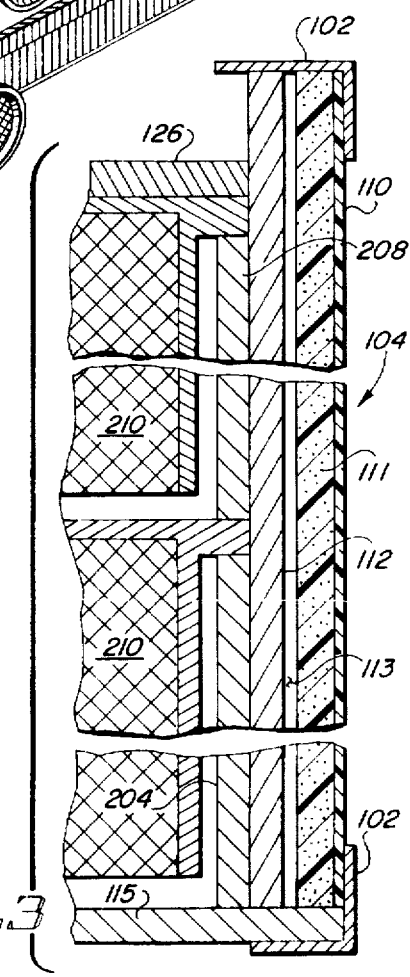
FIG. 3 is a partial cross sectional view of a hive system exterior wall and a portion of a hive chamber.

Turning briefly to FIG. 3, FIG. 3 is a cross sectional view of an exterior perimeter wall 104 and a portion of the inner hive chamber. The exterior walls 104 sit on a hive system floor 115 in framework 102. The exterior perimeter walls 104 preferably comprise a multilayered wall, with a exterior surface portion 110 comprising a suitable weather resistant material, such as thin plastic. The preferable plastic is an ultra-violet light resistant polypropylene. The use of polypropylene for surface portions of the walls provides a weather resistant, long lasting wall that does not require paint or other finish. One type of suitable material is a copolymer polypropylene manufactured under the trade name Coroplast. Of course, other suitable materials such as other polymers (polyolefins, polyurethane), fiberglass, metal or treated wood can be used.

The exterior surface portion 110 is preferably sealed to framework 102 along the bottom edge to prevent water from leaking between the framework 102 and exterior surface portion 110 into the hive system 100. The preferred method of sealing uses a bead of ultra-violet light resistant silicone between the surface portion 110 and the framework 102. Of course, other suitable materials such as latex based caulking and solvent adhesives can be used. The use of these types of sealants seals the frame system 100 while allowing the exterior surface portion 110 to be removed without excessive difficulty if necessary.

The exterior perimeter walls 104 also preferably comprise a core 111. The core 111 provides increased insulation for the hive system 100. The core 111 preferably comprises a insulating material such as expanded polystyrene (EPS) or other insulating foams. Of course, other suitable insulating core materials can be used such as urethane foam board, bubble insulation and fiberglass insulation.

The interior portion 112 of the walls 104 preferably comprises a wood interior 112. The wood sheet 112 preferably comprises a structural paneling such as plywood or Orientated Strand Board (OSB). Of course, other materials can be used such as cross-laminated wood veneer. To maintain proper spacing in a hive system 100 with the preferred dimensions, the wood interior 112 should comprise ½ inch thick wood, with a nominal thickness of $^{15}/_{32}$ inches.

In the preferred embodiment an vent space 113 exists between the wood interior 112 and the core 111. The vent space 113 creates a path for moisture from inside the hive to vent out, reducing the possibility of wood rot. The vent space 113 can be maintained by a variety of methods. One easy method uses a few strips of polypropylene, such as excess from the exterior surface portion 110 material, between the wood interior 112 and the core 111.

In the preferred embodiment an air space (not shown in FIG. 3) is created between the exterior surface portion 110 and the core 111. This air space can be created by providing a polypropylene exterior surface portion 110 that is cut precisely to fit the framework 102 at 85° F. The polypropylene exterior expands when heated by ambient air temperature of direct sunlight, causing it to bow out approximately ½ inch, creating an air space.

In the preferred embodiment, the exterior walls 104, including the exterior surface portion 110, core 111 and wood interior 112, are not permanently fastened to the hive system and can thus be easily replaced when needed.

Returning to FIG. 1, the hive system 100 also comprises at least one divider wall (e.g., 120 and 122). The divider walls serve to divide the interior space of the hive system 100 into a plurality of hive chambers for housing a plurality of bee colonies. In the preferred embodiment, the divider walls include a center divider wall 120 extending from one side wall 108 to the other. Thus, the center divider wall 120 divides the interior hive system space into two portions. In the preferred embodiment, each of these portions can then be subdivided into a plurality of hive chambers by the use of additional divider walls, in particular, subdivider walls 122.

The number of subdivider walls 122 can be adjusted to allow the hive system 100 to house the desired number of honey bee colonies in separate hive chambers. Additionally, the size of hive chambers themselves can be varied. This allows the hive system 100 to store honey bee colonies of different strengths that require different size hive chambers.

In the preferred embodiment, none of the divider walls are permanently attached to the hive system. Thus, all divider walls, such as center divider wall 120 and subdivider walls 122 can be removed easily and replaced when needed. Preferably, the divider walls comprise wood, such as plywood or OSB. To maintain proper spacing in a hive system 100 with the preferred dimensions, the divider walls should comprise ½ inch (¹⁵⁄₃₂ nominal) wood.

In the preferred embodiment, the hive system 100 includes six subdivider walls 122 in addition to the center divider wall 120. Thus, the hive system 100 can be divided into eight hive chambers, housing eight separate honey bee colonies. Each hive chamber is covered with a chamber lid 126. (in FIG. 1, one lid is removed to show the frames within the hive chamber). Each chamber lid 126 preferably has a slot about ⅛ inch thick and 3 inches long. The slot facilitates a hive tool being used to lift the chamber lid. When the hive system is made according to the preferred embodiment dimensions, each of these eight hive chambers can hold two levels of seven standard Langstroth sized frames, for a total of 14 frames. The preferred embodiment hive system is thus dimensioned to house eight 14 frame bee colonies, and is thus optimized for use in agricultural pollination operations.

Additionally, in the preferred embodiment, one or more subdividers can be removed, resulting in two 14 frame chambers becoming one 30 frame chamber (removing the subdivider adds room for one additional frame on each level). When the hive system is dimensioned according to the preferred embodiment, the removed subdivider can be placed directly atop the combined hive chambers. This configuration is illustrated in FIG. 1. In particular, a subdivider 124, substantially identical to the other subdividers 122, has been removed and placed atop two of the hive chamber lids (not shown in figure), forming one larger hive chamber. Thus, the subdivider 124 seals the larger hive chamber by blocking the gap that exists between the chamber lids when the subdivider wall is removed.

Each of the front walls 106 has a plurality of hive openings, with at least one hive opening provided for each of the plurality of bee colonies. In the preferred embodiment, plastic ABS couplers are inserted into the hives openings 130. The ABS couplers used are designed to fit over standard ABS pipe that is commonly used for drainage pipe in residential housing. The plastic ABS couplers used are preferably adapters used for 3 inch diameter ABS pipe. This allows 3 inch diameter ABS pipe to be fit into the hive openings 130 to facilitate a wide variety of accessories being placed into the openings. These fittings can thus be easily affixed by sliding the ABS pipe into the fitting as needed. Of course, other suitable entrance sizes and materials may be used, such as 2 inch ABS or PVC pipe. Likewise, more conventional slot-type entrances can also be used.

For example, a hive closure adapter 132 can be fabricated by stretching tight wire mesh across a portion of ABS pipe 134. With the hive closure adapters 132 inserted into the ABS couplers, the hive openings 130 are sealed such that bees cannot escape the hive system 100. This allows a hive system to be transported without the normally required extensive and expensive netting over the truck. As another example, #4 mesh on a pipe can serve as a mouse excluder while allowing the bees to come and go. Other possible accessories that can be easily made from 3 inch ABS include frog excluders, entrance reducers and pollen traps. Thus, the preferred embodiment provides a hive system that is easy to move without extensive netting and is easy to attach a variety of hive entrance fittings.

To facilitate moving the hive system 100 an integrated pallet base is provided on the underside of the hive system 100. The pallet base comprises three rails 140. In the preferred embodiment, the three rails 140 comprise standard treated two-by-fours screwed into the framework 102. This allows the hive system 100 to be easily loaded and unloaded using conventional forklifts. Also, each of the three rails 140 can easily be replaced if needed. With the pallet base 140 and the inherent stability of the design, forklifts can be used to easily and rapidly distribute the hive systems across fields. This allows the hives to be placed for efficient pollination of agricultural crops and honey production.

Figure 2:
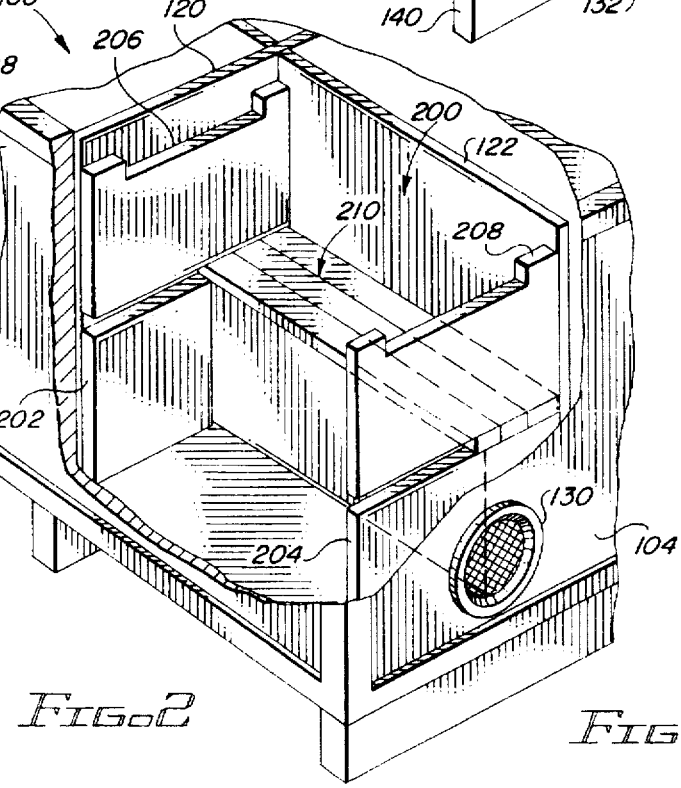
FIG. 2 is a cut away view of a hive chamber in accordance with the preferred embodiment.

Turning to FIG. 2, FIG. 2 is a sectional view of hive system 100 illustrating a hive chamber 200 in accordance with the preferred embodiment. The hive chamber 200 is a portion of the hive system 100 interior space bounded by a subdivider 122 and a center divider 120. Each hive chamber such as hive chamber 200 houses one honey bee colony. Inside the hive chamber 200 are two lower frame rests, including a front lower frame rest 204 and a rear lower frame rest 202. Preferably, the lower frame rests 202 and 204 are ½ inch plywood or OSB. The lower frame rests are preferably placed in the hive chamber 200 and held in place only by the dividers and exterior walls, and the frames 210. With no permanent fasteners used, the frame rests can be easily removed when needed, such as if they become rotted or damaged. The front frame lower rest 204 preferably includes an opening that corresponds to the hive opening 130.

Atop the lower frame rests 202 and 204 sit a plurality of frames 210. The frames 210 are preferably industry standard Langstroth-type frames, thus compatible with traditional hives. In the embodiment with the preferred dimensions, seven frames sit upon the lower frame rests with proper spacing needed to provide correct bee spacing. Additionally, the lower frame rests 202 and 204 serve to maintain proper bee spacing between frames 210 and the exterior walls 104 and the center divider 120. Thus, with the proper bee spacing, the bees will not fill the gaps with propolis or draw burr or brace comb out in the gaps, either of which would cause the pieces of the hive system to become stuck together and difficult to remove.

Atop the frames 210 sit two upper frame rests 206 and 208. Preferably, these two upper frame rests are ½ inch plywood or OSB. One upper frame rest 206 sits at the rear of the hive chamber 200, adjacent the center divider wall 120. Another upper frame rest 208, sits at the front, adjacent the exterior wall 104. Atop these two upper frame rests sits another plurality of frames (not shown in FIG. 2). In the preferred embodiment dimensions, seven frames can sit on the upper frame rests 208 with proper spacing between each frame. Thus, a total of 14 frames reside in hive chamber 200.

The upper frame 206 and 208 rests are preferably notched with two raised portions at each end. The two raised portions at the edges of the top of the upper frame rests prevent the frames from moving all the way the to edge of the frame rest. This provides the proper bee spacing between the outer frames and the exterior side walls 108 and subdividers 122. In the preferred embodiment, the raised portions are ¾ inches tall and have a ⅛ inch width. The two lower frame rests 202 and 204 can also be notched in a similar manner, although in that case the raised portions should have a ⅛ inch height.

The upper frame rests are also preferably dimensioned to hold and be held in place by the dividers, exterior walls and the frames. Again, with no permanent fasteners used, the frame rests can be easily removed when needed, such as if they become rotted, damaged, or if the frames in the bottom of hive chamber require removal or inspection.

Returning to FIG. 1, the preferred embodiment also includes a hive system roof 150. The hive system roof has a rigid framework 152 around its perimeter, sized slightly larger than the hive system such that it can slide over the hive system framework 102. Again, the roof framework 152 is preferably a metal framework made from L-shaped metal, commonly known as "angle iron." The hive system roof 150 is preferably a multilayer design with an exterior portion, a core portion and an interior portion. The exterior portion is preferably ⅛ inch fiberglass with ultra-violet light inhibitors. Of course, other exteriors could be used, such as ABS plastic. In the preferred embodiment the fiberglass is sealed to the roof framework 152 with a silicone based sealant. Of course, other types of sealants can be used.

The core portion of the hive system roof 150 is preferably a material with good insulating qualities, such as expanded polystyrene (EPS) or other insulating foams with a preferred thickness of ¾ inch.

The interior portion of the hive system roof 150 is preferably made of a material which will protect the core portion. In the preferred embodiment the interior portion is made of ⅛ inch thick polypropylene. Of course, other suitable materials such as fiberglass or wood paneling can be used.

Together, roof 150 serves to insulate the hives from excessive heat and cold, and also keep rain and other weather from entering the hive system.

Returning to FIG. 2, the floor 115 of the hive system is preferably a wood floor made from material such as plywood or OSB. Additionally, in the preferred embodiment, holes in the floor for each hive chamber are provided and covered with a tight mesh screen or filled with a plastic mesh plug. This allows for further ventilation of the colonies. This can be especially important when the usual hive openings are closed off during transportation, causing bees to clog up the openings in an attempt to leave the hive chamber.

A hive system has been disclosed that overcomes the limitations of the prior art. In particular, the preferred embodiment hive system is one in which almost all pieces are individually replaceable. This is accomplished by dimensioning the framework, perimeter walls, divider walls and frame rests to hold each other in place without the use of fasteners. Thus, when one pieces rots or breaks, it can be easily replaced in the field, without requiring a trip to a woodworking shop. Furthermore, the preferred embodiment does not require paint, and is instead protected with exterior surfaces that are weather and sunlight resistant. The design is also well insulated, and includes air spaces to allow moisture to vent.

While the invention has been particularly shown and described with reference to a preferred exemplary embodiment thereof, it will be understood by those skilled in the art that various changes in form and details may be made therein without departing from the spirit and scope of the invention.

We claim:

1. A hive system for housing a plurality of bee colonies, the hive system comprising:

a) a hive system body, said hive system body having four exterior perimeter walls, including two front walls and two side walls, a floor and a hive system interior space;

b) a center divider wall, said center divider wall extending between said two side walls and dividing said hive system interior space into two hive system interior space portions;

c) a plurality of sub-divider walls, each of said plurality of sub-divider walls extending from one of said two front walls to said center divider wall, said plurality of sub-divider walls further dividing said two hive system interior space portions into a plurality of hive chambers for housing a plurality of bee colonies; and d) at least two lower frame rests for each of said plurality of bee chambers and further comprising at least two upper frame rests for each of said plurality of bee chambers.

2. A hive system for housing a plurality of bee colonies; the hive system comprising:

a) a hive system framework, said hive system framework comprising a rigid rectangular parallelpiped perimeter;

b) four perimeter walls including two front walls and two side walls, a floor, said floor and each of said perimeter walls removably affixed to said hive system framework and forming a hive system interior space, said perimeter walls comprising a polypropylene exterior and a wood interior;

c) a center divider wall, said center divider wall extending between said two side walls and dividing said hive system interior space into two hive system interior space portions;

d) a plurality of sub-divider walls, each of said plurality of sub-divider walls extending from one of said two front walls to said center divider wall, said plurality of sub-divider walls further dividing said two hive system interior space portions into a plurality of hive chambers for housing a plurality of bee colonies;

e) at least two lower frame supports in each of said plurality of hive chambers;

f) at least two upper frame supports in each of said plurality of hive chambers;

g) a plurality of hive openings, at least one of said plurality of hive openings providing access into each of said plurality of hive chambers;

h) a roof flamework said roof flamework comprising a rigid perimeter sized to fit atop said hive system framework; and i) a roof wall removably affixed in said roof framework, said roof wall comprising a fiberglass exterior and polypropylene interior with a foam core sandwiched between said fiberglass exterior and said polypropylene interior.

\* \* \* \* \*